US008818958B2

(12) United States Patent
Murphy et al.

(10) Patent No.: US 8,818,958 B2
(45) Date of Patent: Aug. 26, 2014

(54) VIRTUAL SAFE DEPOSIT BOX FOR PERPETUAL DIGITAL ARCHIVAL

(75) Inventors: Elissa E. S. Murphy, Seattle, WA (US); Lara M. Sosnosky, Kirkland, WA (US); Navjot Virk, Bellevue, WA (US); John D. Mehr, Kenmore, WA (US); Catherine Claire Marshall, San Francisco, CA (US); Yan V. Leshinsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 12/408,199

(22) Filed: Mar. 20, 2009

(65) Prior Publication Data

US 2010/0241617 A1 Sep. 23, 2010

(51) Int. Cl.
*G06F 7/00* (2006.01)
*G06F 17/00* (2006.01)

(52) U.S. Cl.
USPC ............................................ 707/661; 707/665

(58) Field of Classification Search
None
See application file for complete search history.

(56) References Cited

U.S. PATENT DOCUMENTS

| 6,879,965 | B2 * | 4/2005 | Fung et al. ..................... 705/39 |
| 6,903,972 | B2 | 6/2005 | Lasser et al. |
| 7,103,604 | B2 * | 9/2006 | Maeda et al. ..................... 1/1 |
| 7,340,607 | B2 | 3/2008 | Abhyankar et al. |
| 7,441,277 | B2 * | 10/2008 | Burges et al. .................. 726/29 |
| 8,015,164 | B2 * | 9/2011 | Hamada ........................ 707/694 |
| 2002/0046188 | A1 * | 4/2002 | Burges et al. .................. 705/67 |
| 2002/0169632 | A1 | 11/2002 | Grossman |
| 2003/0097331 | A1 * | 5/2003 | Cohen ............................. 705/39 |
| 2004/0024714 | A1 * | 2/2004 | Wells et al. ..................... 705/78 |
| 2004/0230536 | A1 * | 11/2004 | Fung et al. ..................... 705/64 |
| 2005/0033735 | A1 * | 2/2005 | Shapiro ............................. 707/3 |
| 2005/0071253 | A1 * | 3/2005 | Yang ............................... 705/27 |
| 2005/0131815 | A1 * | 6/2005 | Fung et al. ..................... 705/39 |
| 2005/0188208 | A1 * | 8/2005 | Day et al. ....................... 713/182 |
| 2005/0246292 | A1 * | 11/2005 | Sarcanin ........................ 705/67 |
| 2007/0150475 | A1 * | 6/2007 | Hamada ............................ 707/9 |
| 2007/0220614 | A1 * | 9/2007 | Ellis et al. ....................... 726/27 |
| 2008/0212782 | A1 * | 9/2008 | Brettle et al. ................. 380/277 |
| 2009/0025092 | A1 | 1/2009 | Smith et al. |
| 2009/0094701 | A1 * | 4/2009 | Halcrow et al. ................. 726/27 |

OTHER PUBLICATIONS

A Digital Preservation Strategy for Parliament http://www.parliament.uk/documents/upload/DIGITAL%20PRESERVATION%20STRATEGY%20final%20public%20version.pdf. Last accessed Jan. 28, 2009, 13 pages.

(Continued)

*Primary Examiner* — Tony Mahmoudi
*Assistant Examiner* — Tuan A Pham
(74) *Attorney, Agent, or Firm* — Bryan Webster; Andrew Sanders; Micky Minhas

(57) ABSTRACT

The claimed subject matter provides a system and/or a method that facilitates employing a safe deposit box that allows perpetual archiving of data. An online safe deposit box can store a portion of data, wherein the online safe deposit box is hosted by a data storage service provider. An archival model component can implement the online safe deposit box for perpetual archival of the portion of data. The archival model component can ensure at least one of the following: the online safe deposit retains the portion of data for a pre-defined duration; the portion of data within the online safe deposit box is accessible solely by an authorized entity; or the integrity of the portion of data is maintained, wherein the integrity is modified solely by an authorized user.

20 Claims, 10 Drawing Sheets

(56) References Cited

OTHER PUBLICATIONS

Digital Archiving: Tessella's Offerings and Experience. Issue: V2.R0.M0, last updated May 19, 2008. http://www.tessella.com/wp-content/uploads/2008/06/e_digitalarchiving.pdf. Last accessed Jan. 28, 2009, 3 pages.

The Benefits of Using Tilana Reserve http://www.tilana.com/tilana-reserve/tr-how/benefits.aspx. Last accessed Jan. 28, 2009, 1 page.

Storer, et al. Long-Term Threats to Secure Archives. StorageSS'06, Oct. 30, 2006, Alexandria, Virginia, USA. ACM 1-59593-552-5/06/0010 http://cs.njit.edu/~crix/CS.698/papers/threats-storagess06.pdf. Last accessed Jan. 28, 2009, 7 pages.

AT&T Launches Automated Online PC Backup Services for Consumers, Small Businesses, Sep. 27, 2006. http://www.att.com/gen/press-room?pid=4800&cdvn=news&newsarticleid=22789. Last accessed Jul. 31, 2009, 2 pages.

* cited by examiner

VIRTUAL SAFE DEPOSIT BOX FOR PERPETUAL DIGITAL ARCHIVAL

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

In light of such advances, the amount of available electronic data grows and it becomes more important to store such data in a manageable manner that facilitates user friendly and quick data searches and retrieval. Today, a common approach is to store electronic data in one or more databases or data stores. In general, a typical data store can be referred to as an organized collection of information with data structured such that a computer program can quickly search and select desired pieces of data, for example. Commonly, data within a data store is organized via one or more tables. Such tables are arranged as an array of rows and columns.

With the advent of highly sophisticated computer software and/or hardware, servicing areas associated therewith have stormed into existence in order to meet consumer high-demands. Typically, computational services are undertaken upon a client or within a proprietary intranet. Client-side systems are employed to manage relationships between users, software applications, services, and hardware within a client machine, as well as data resident upon a respective intranet. However, in addition to client-side systems providing services, off-site systems (e.g., third party) can also provide services in order to improve data capability, integrity, reliability, versioning, security, and mitigate costs associated therewith.

In general, these services can be employed to manage relationship between users, provide software applications, enhance hardware capabilities, manage data, optimize security, etc. For example, a third party service can enable a client to store data therewith limited solely by the third party capabilities (e.g., hardware, software, etc.). In particular, the off-site or remote data storing services enable users to access data storage via the Internet or the web for data upload or download. Such off-site or remote data storage service providers can provide backup functionality and techniques including redundancy, safe-guarding, privacy, and safe-guards against losing data. Yet, such techniques can be enhanced in various ways in order to manage the vast amount of digital information created. For example, massive amounts of information within a physical medium is being converted or generated into a digital form.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate enhancing a safe deposit box to manage digital forms of data. An archival model component can implement an online safe deposit box that is modeled and replicates a physical safe deposit box. In particular, the archival model can employ the virtual safe deposit box in which data can be preserved for a lifespan of an entity or a lifespan of the safe deposit box. The archival model component can further ensure the privacy of the safe deposit box, wherein access can be guaranteed to be restricted to solely authorized entities. Moreover, the archival model component can enforce data integrity for the safe deposit box for maintaining the state and condition of the data within the safe deposit box.

The subject innovation can further enable the definition of access settings for the data within the safe deposit box or the safe deposit box. The access settings can include entity authorization for access, definition of a type of access to the safe deposit box, definition of which data can be accessed by an entity, or a data modification capability. Furthermore, the access settings can be maintained for a defined duration. In other aspects of the claimed subject matter, methods are provided that facilitate archiving digital information perpetually.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
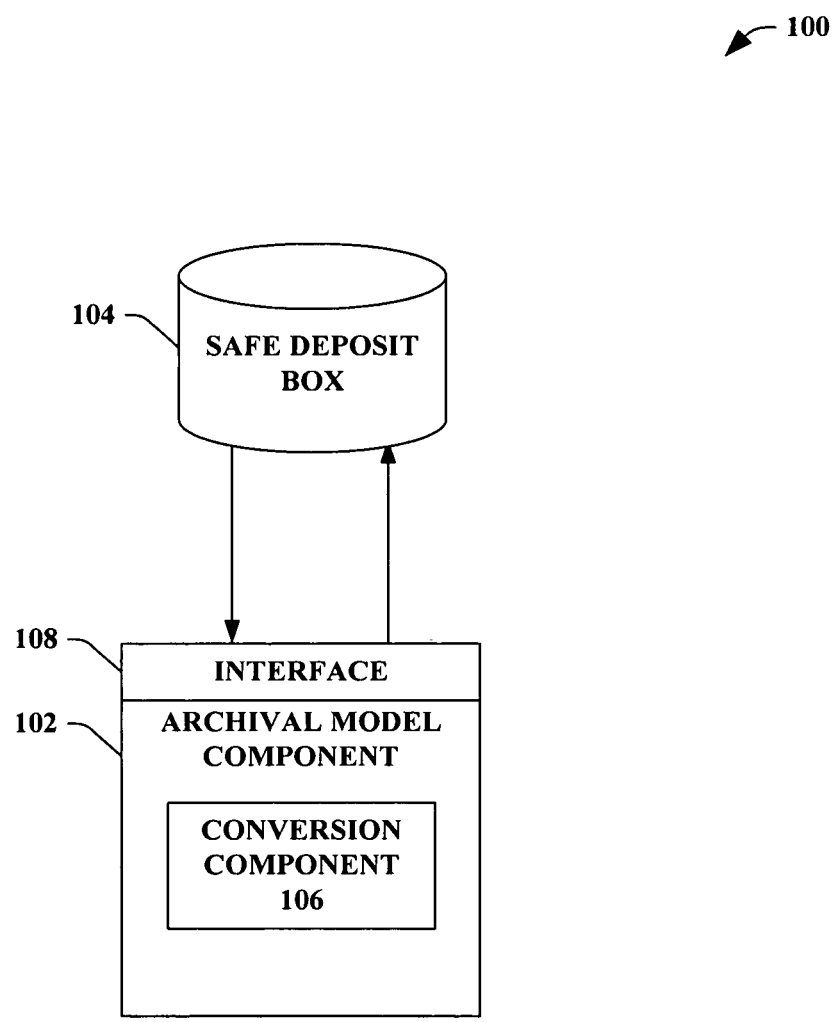
FIG. 1 illustrates a block diagram of an exemplary system that facilitates archiving digital information perpetually.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "safe deposit box," "manager," "engine," "cloud," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates archiving digital information perpetually. The system 100 can include an archival model component 102 that can enhance a safe deposit box 104 by enabling a perpetual archival of data. The archival model component 102 can archive digital data within the safe deposit box 104, wherein such archiving can include a guarantee and security. In general, the archival model component 102 can digitalize and virtualize the safe deposit box 104, intended and primary use of the safe deposit box 104, access limitations related to the safe deposit box 104, and a life-guarantee of data preservation. The archival model component 102 can provide the safe deposit box 104 with substantially similar safe-guards, guarantees, purpose, and concepts that align with a physical safe deposit box. The essence of the safe deposit box 104 can be to provide a digital archival of data that provides equivalent or greater guarantees and security that a true safe deposit box would provide. Moreover, the archival model component 102 can enable data in a physical medium to be perpetually digitized (e.g., converted into an electronic form) and stored into the safe deposit box 104.

The archival model component 102 can further utilize a conversion component 106 that can automatically transform data in a physical form to data in a digital or electronic form. The conversion component 106 can automatically create digital data from physical data in order to allow the archival model component 102 to perpetually archive data within the safe deposit box 104. For example, important paper documents can be automatically converted and digitally stored within the safe deposit box 104, wherein such preservation of the data can be guaranteed for any suitable duration of time. For instance, the data can be preserved within the safe deposit box 104 for an owner's lifetime. In another example, the data can be archived and stored for an indefinite amount of time so as to ensure it will be available forever. It is to be appreciated that data can be archived within the safe deposit box 104, wherein the archive can entrust bits of the data to be decodable into perpetuity (e.g., digitally legible). On the contrary, a backup of data can allow a state of the system or the file system to be restored without any regard to the legibility of the bits of the data.

The safe deposit box 104 can be any suitable online data storage that can store data. Furthermore, the safe deposit box 104 can enable a user to upload data to the safe deposit box 104 as well as download data from the safe deposit box 104. It is to be appreciated that the safe deposit box 104 can be substantially similar to an electronic form of a physical bank deposit box. For example, a bank deposit box enables designated individuals to access (e.g., store or retrieve) physical items from a secure location, whereas the safe deposit box 104 can be an electronic medium or storage medium in a remote location that enables designated individuals to access data (e.g., upload or download) via a machine (e.g., computer, laptop, portable digital assistant (PDA), mobile device, smartphone, cellular device, a portable gaming device, a media player, a web browser, a device that leverages an operating system, etc.). Moreover, the safe deposit box 104 can be remote in comparison to the local operating system 106. Thus, the safe deposit box 104 can be located on a remote server, on a remote network, online, on the Internet, etc.

In addition, the system 100 can include any suitable and/or necessary interface component 108 (herein referred to as "the interface 108"), which provides various adapters, connectors, channels, communication paths, etc. to integrate the archival model component 102 into virtually any operating and/or database system(s) and/or with one another. In addition, the interface 108 can provide various adapters, connectors, channels, communication paths, etc., that provide for interaction with the archival model component 102, the safe deposit box 104, the conversion component 106, and any other device and/or component associated with the system 100. It is to be appreciated that an additional interface (not shown) can allow a third-party to access the data (e.g., via a web service, etc.) while the interface 108 enables interaction with the safe deposit box 104. Moreover, it is to be appreciated that the interface 108 or the third-party interface (not shown) can utilize a plug-in written to migrate data to a format (e.g., existing format, new format, etc.). Thus, the migration can happen and be written back to the safe deposit box 104.

Figure 2:
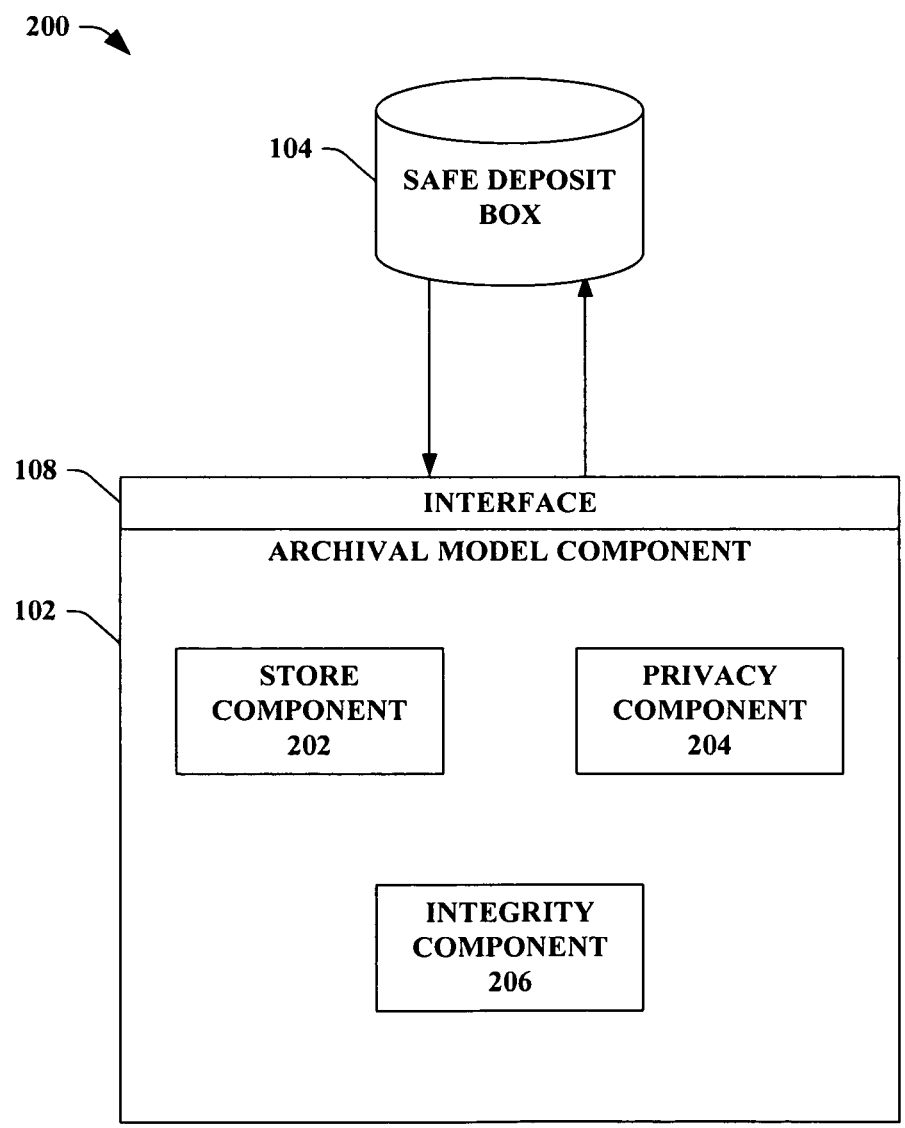
FIG. 2 illustrates a block diagram of an exemplary system that facilitates enhancing a safe deposit box to manage digital forms of data.

FIG. 2 illustrates a system 200 that facilitates enhancing a safe deposit box to manage digital forms of data. The system 200 can include the archival model component 102 can provide the safe deposit box 104 with substantially similar safeguards, guarantees, purpose, and concepts that align with a physical safe deposit box. In other words, a real-world, physical safe deposit box can be virtually created and implemented (e.g., the safe deposit box 104) following features and techniques associated with the physical real-world safe deposit box. Replication of the physical safe deposit box for the virtual or digital safe deposit box 104 can enhance data preservation and archival. The system 200 can provide users with a perpetual archive to the safe deposit box 104 and guarantee safe storage forever. The safe deposit box 104 can be implemented on top of the perpetual archive system for users to manage digital data.

The archival model component 102 can include a store component 202 that can provide data preservation within the safe deposit box 104. In particular, the store component 202 can preserve data within the safe deposit box 104 for a pre-defined period or duration. For example, without any pre-defined period or duration, the store component 202 can ensure (e.g., guarantee) data will be maintained within the safe deposit box 104 for an indefinite period. The store component 202 can provide guarantees to store or preserve data for a pre-defined period or an indefinite duration.

For example, an owner of the safe deposit box 104 can enter an arrangement with the data storage service provider whereby the data service provider guarantees that the data will not be lost, changed, or destroyed unintentionally for the duration of the agreement. In another example, the store component 202 can employ an agreement that extends beyond the lifespan of the owner (e.g., the original user). Additionally, the safe deposit box 104 can enable access to data stored on the safe deposit box 104. Following such an example with shared access to the safe deposit box 104, a secondary party (e.g., an entity with permission to access the safe deposit box 104) can have access to the safe deposit box 104 and its contents either via safe-guards during the pre-defined duration (e.g., while the owner is still alive, the owner has rights or owns the safe deposit box 104, etc.). Moreover, the access rights to the safe deposit box 104 can be handed off or transferred based upon a policy (e.g., discussed in more detail in FIG. 3). For example, access to the safe deposit box 104 or the safe deposit box 104 can be transferred to a disparate entity (e.g., user, machine, computer, website, network, server, group of users, enterprise, service provider, etc.) other than the owner when the owner is deceased.

The archival model component 102 can further include a privacy component 204 that can employ restrictions to access to the safe deposit box 104. For example, the privacy component 204 can utilize security techniques such as, but not limited to, a secure key, a proof of identity, a dual key, a username, a password, any suitable verification technique etc. The privacy component 204 can enforce guarantees whereby the owner or user is provided with security and access provisions that maintain that authorized entities (e.g., users that prove identity, and are explicitly allowed access, etc.) can access (e.g., open, etc.) the safe deposit box 104. The privacy component 204 can protect data within the safe deposit box 104 from access or modification by any other party with exception only to legal constraints such as subpoenas for the data, Power of Attorney, etc. The privacy component 204 can further provide encryption for data within the safe deposit box 104 utilizing keys. The keys for encryption can be stored outside the data storage service provider. For example, the keys can be stored with the user, owner, and/or any entity authorized for access to the safe deposit box 104.

The system 200 can include an integrity component 206 that can ensure (e.g., guarantee) that data within the safe deposit box 104 can be preserved. In other words, the integrity component 206 can maintain the state of data stored within the safe deposit box 104, wherein such maintenance ensures that the data is not modified, manipulated, accessed, and the like by an entity unless such entity is authorized. For example, the integrity component 206 can provide an explicit guarantee that data within the safe deposit box 104 can be preserved for the lifespan of the safe deposit box 104. In other words, the data within the safe deposit box 104 can be preserved without any erroneous modification, corruption, or changes. The integrity component 206 can further perform any necessary backend processes and/or procedures in order to ensure such guarantee is met or enforced.

Figure 3:
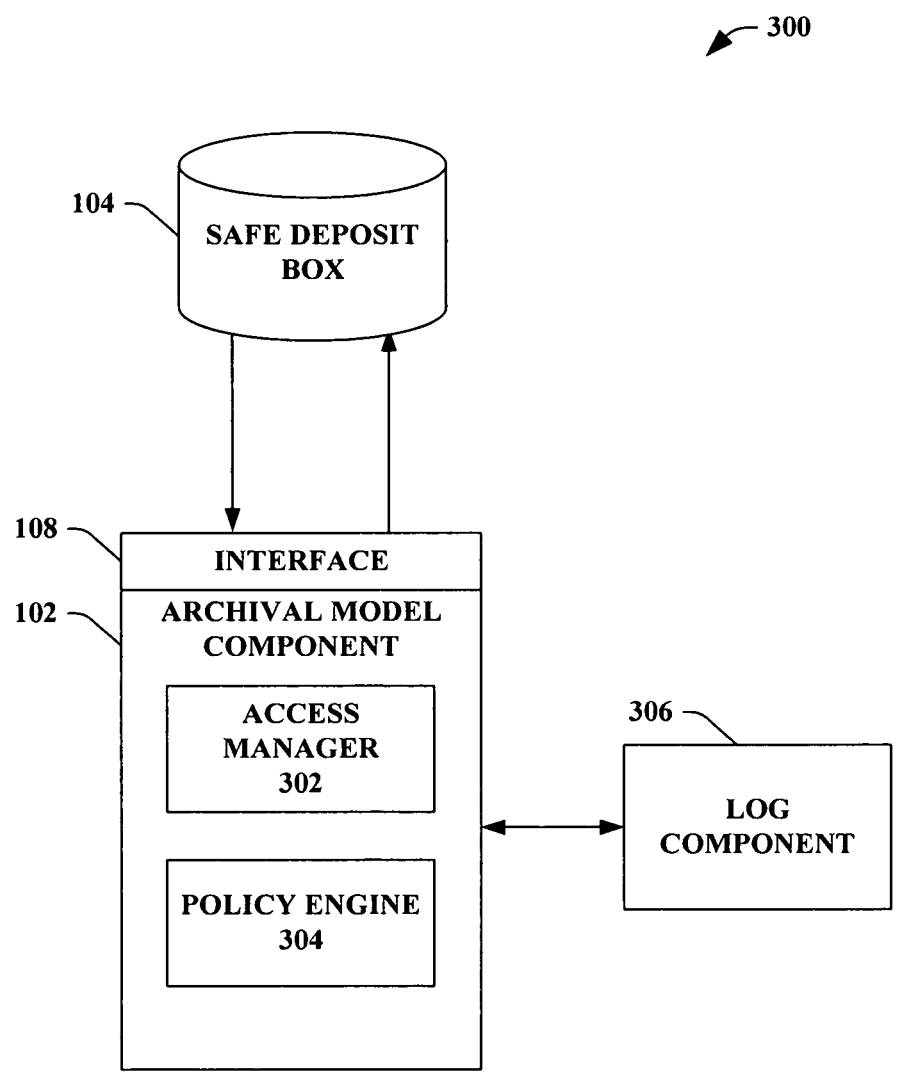
FIG. 3 illustrates a block diagram of an exemplary system that facilitates managing digital forms of data within a safe deposit box.

FIG. 3 illustrates a system 300 that facilitates managing digital forms of data within a safe deposit box. The system 300 can include the archival model component 102 that can implement the safe deposit box 104 with characteristics and features substantially similar to a physical real-world bank safe deposit box. As previously discussed, the archival model component 102 can employ various guarantees such as data preservation for a pre-defined duration (e.g., lifespan of the safe deposit box 104, lifespan of an owner, etc.), restrictions to access (e.g., authorized access to the safe deposit box 104, proof of identity for access, etc.), and/or data state preservation (e.g., data within the safe deposit box 104 is guaranteed to not be modified, changed, etc.).

The archival model component 102 can utilize an access manager 302 that can modify access settings related to the safe deposit box 104. In general, the safe deposit box 104 can be implemented, based upon the guarantees defined within the archival model component 102, with access solely granted to an owner of such safe deposit box 104. The access manager 302 can enable the safe deposit box 104 to be accessed or shared with disparate entities other than the original owner. Thus, the safe deposit box 104 can be shared or accessed by two or more entities or users in order to allow data access to information stored within the safe deposit box 104.

Moreover, the access manager 302 can employ a granular level of data sharing or access, wherein each authorized or approved user can include respective data access. In other words, an owner of a safe deposit box can elect or authorize user A and user B to have access to information within the safe deposit box. Yet, the owner can further define access privileges, wherein user A can only access a first set of data within the safe deposit box and user B can only access a second set of data within the safe deposit box. Further, the owner can reserve access rights to particular portions of data within the safe deposit box such that the owner can only access a third set of data within the safe deposit box.

The access manager 302 can further define settings related to a type of data access such as, but not limited to, input to the safe deposit box, output from the safe deposit box, etc. For instance, a first user can be authorized by the owner to only download information from the safe deposit box, whereas a second user can be authorized by the owner to upload and download information to and from the safe deposit box. The access manager 302 can configure a modification capability for each authorized user/entity. For example, user A can be defined to only have data read only rights within the safe deposit box, whereas user B can be granted read and write privileges for data within the safe deposit box.

The access manager 302 can enforce the defined settings in accordance to a duration or condition. In general, the duration or condition can be a duration of time, a lifespan (e.g., a lifespan of an owner, a lifespan of the safe deposit box, a lifespan of a defined authorized user, etc.), or an event (e.g., an owner re-defining settings or authorizations related to the safe deposit box, a leave of absence, a vacation, an achievement such as a graduation, an employment position, etc.). It is to be appreciated that the duration or condition can be defined by a policy (discussed below), wherein the policy can dictate the duration or a change in the defined settings for the safe deposit box 104.

The archival model component 102 can further leverage a policy engine 304 that can detect a trigger various changes in at least one of the data within the safe deposit box 104, the safe deposit box 104, and/or the access of the safe deposit box 104. The policy engine 304 can employ any suitable policy (e.g., user-defined custom, customized policy, template policy, etc.) that can trigger a change or modification to the safe deposit box 104. For example, the modification or change can be related to the data stored within the safe deposit box 104, the access or authorization of the safe deposit box, the defined lifespan of the safe deposit box 104, the defined lifespan of a portion of data within the safe deposit box 104, etc.

The policy engine 304 can leverage a data duration policy that can define the duration or lifespan of at least one of a portion of data on the safe deposit box 104 or the safe deposit box 104. For example, the data duration policy can define a time duration that if reached can employ a change in a portion of data on the safe deposit box 104 or the safe deposit box 104, wherein the change can be a deletion, a modification (e.g., change of ownership, change of data within the safe deposit box 104, etc.), etc. In still another example, the data duration policy can trigger a notification (e.g., an email, a text message, a cellular call, a short message service (SMS) message, a voice message, etc.) to be communicated to an entity (e.g., an owner of the safe deposit box, an authorized user of the safe deposit box, a legal representative, etc.). It is to be appreciated that destruction of data can be guaranteed by a triggering event, wherein a deletion of data is forensically recoverable and a destruction of data is not forensically recoverable. In other words, the claimed subject matter can ensure absolute non-recoverability of data.

The policy component 304 can further provide a transfer policy that can trigger the transfer (e.g., change ownership) of a portion of data within the safe deposit box 104 or the safe deposit box 104 to a disparate entity based upon an event, a duration of time, and the like. For example, the safe deposit box 104 can be transferred to a disparate user based upon an amount of time that has passed. In another example, a portion of data can be transferred to a disparate entity based upon the termination of a lifespan for an owner. Moreover, the policy component 304 can utilize an access policy that can be trigger a change or modification to a defined access setting for the safe deposit box 104 or a portion of data within the safe deposit box 104. For example, based upon an event or an amount of time, the defined access settings related to the safe deposit box 104 can be automatically modified.

The system 300 can utilize a log component 306 that tracks data in accordance with the claimed subject matter. In particular, the log component 306 can track and/or monitor data related to the archival model component 102, the safe deposit box 104, the conversion component (not shown), the access manager 302, the policy engine 304, and/or most any suitable data related to the system 300. For example, the log component 306 can track access with the safe deposit box 104 in order to provide an accurate history of which users interact with the safe deposit box 104 and/or what data is accessed by such users. In another example, the log component 204 can monitor access management (e.g., defined access, access settings, etc.), data uploads (e.g., source of data, data accessed, which users access, etc.), data downloads (e.g., data transferred, target device/user, etc.), policies, conditions, transfers, etc. Moreover, the log component 204 can store the logged entries in any suitable data store, data storage, disk storage, electronic medium, and the like.

The system 300 can further include the safe deposit box 104, wherein the safe deposit box 104 can be an online data store that is maintained by a service. For example, a storage service provider can provide an amount of storage to a user that is accessible via a remote connection. The service provider can utilize a safe deposit box 104 or a data store that can be utilized remotely for data storage. The safe deposit box 104 or data store can be utilized by a user to store any suitable data such as, but not limited to, personal files, media (e.g., pictures, music, video, etc.), documents, word processing documents, passwords, security data, digital data, archival data, spreadsheets, legal documents, audio files, graphic files, text files, email data, calendar data, address information, contact information, programs, etc.

It is to be appreciated that the data store or safe deposit box 104 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store or safe deposit box 104 of the subject systems and methods is intended to comprise, without being limited to, these and any other suitable types of memory. In addition, it is to be appreciated that the data store or safe deposit box 104 can be a server, a database, a hard drive, a pen drive, an external hard drive, a portable hard drive, and the like.

Figure 4:
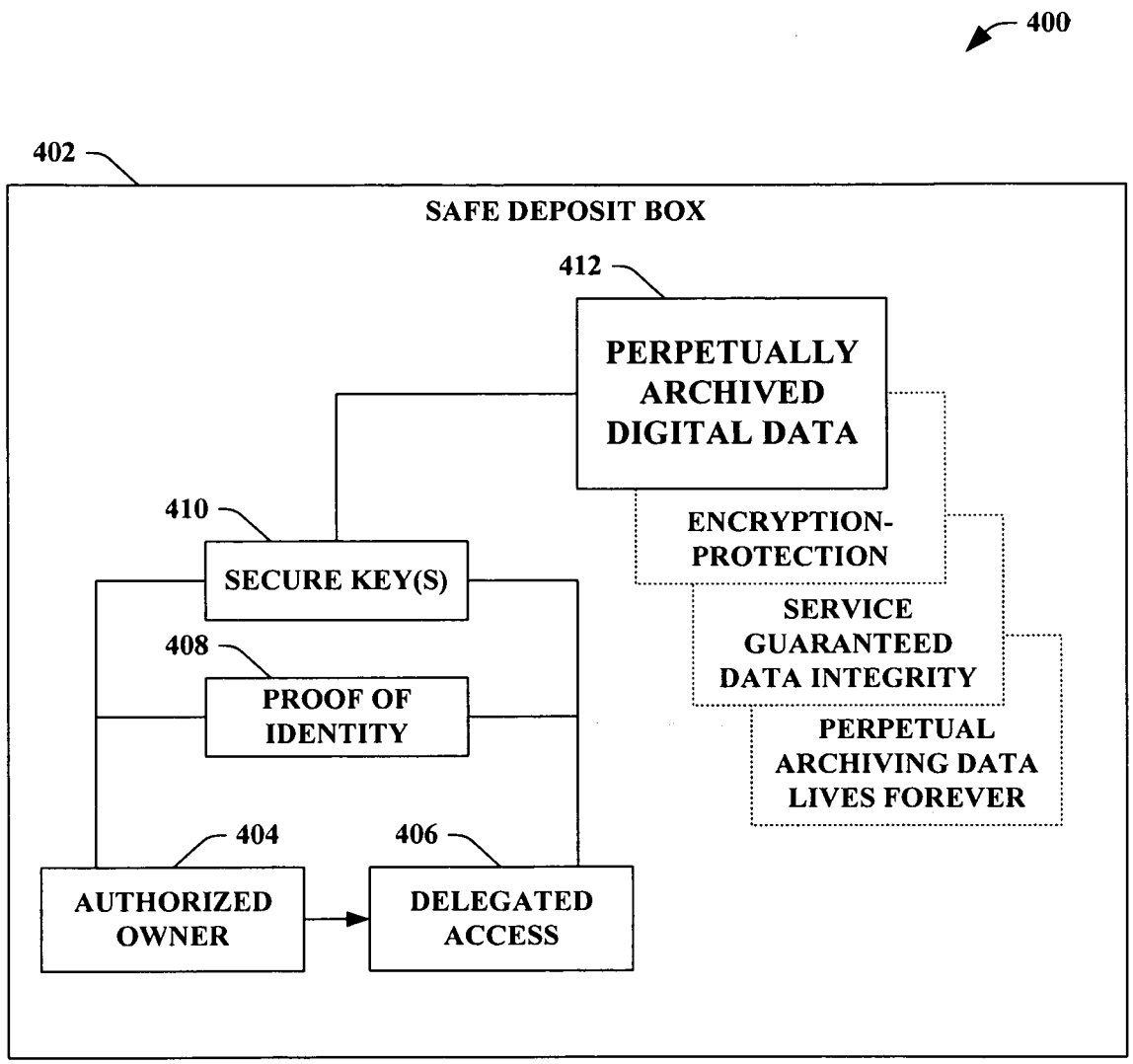
FIG. 4 illustrates a block diagram of an exemplary system that facilitates employing perpetual data archival for a safe deposit box.

FIG. 4 illustrates a system 400 that facilitates employing perpetual data archival for a safe deposit box. The system 400 can include a safe deposit box 402 that can be any suitable online storage device or store that is maintained by a data storage service provider for at least one entity via the Internet. The safe deposit box 402 can be a virtualized and digitized storage environment that replicates a real-world physical safe deposit box. The safe deposit box 402 can include an authorized owner 404 that can grant or define a delegated access 406 to a disparate entity. The authorized owner 404 and/or the entity with the delegated access 406 can be authenticated by, for instance, a proof of identity 408 or a secure key(s) 410. Based upon such authorization, the authorized owner 404 or the user with delegated access 406 can access and/or interact with the safe deposit box 402. The safe deposit box 402 can provide a portion of perpetually archived digital data 412, wherein the portion of perpetually archived digital data 412 can include encryption-protection, service guaranteed data integrity, and/or perpetual archiving that enables indefinite lifespan for data.

Figure 5:
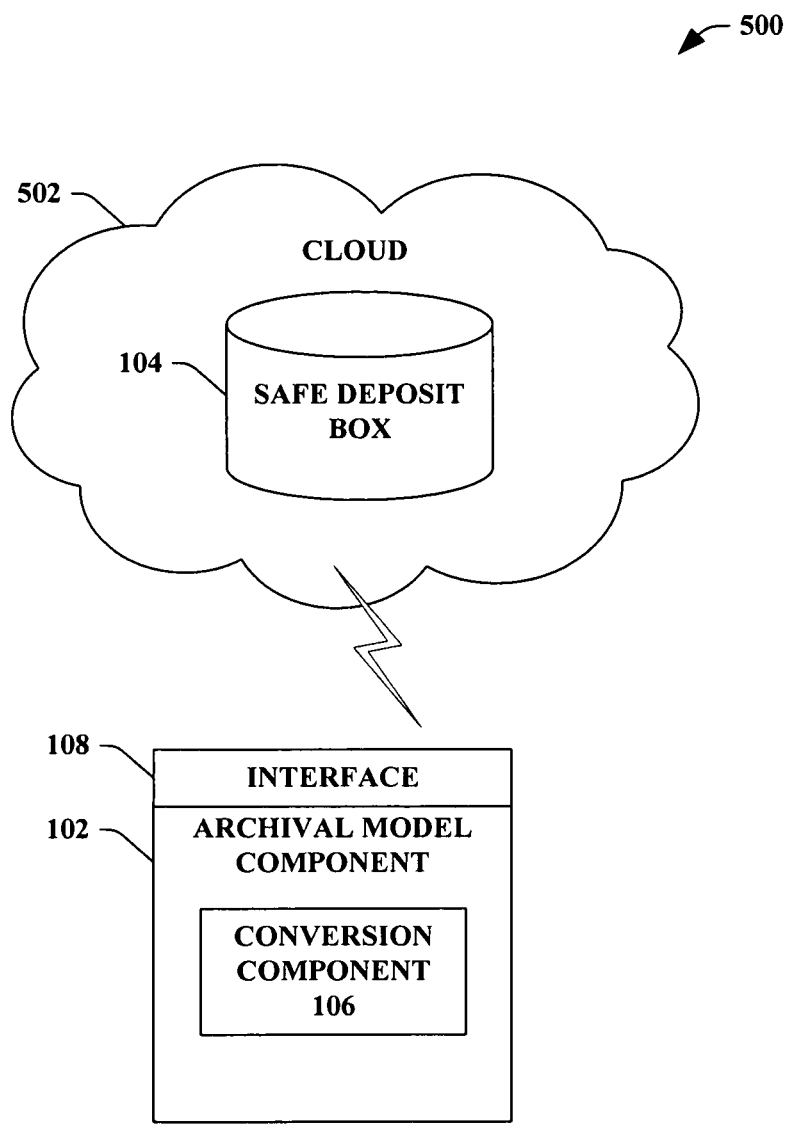
FIG. 5 illustrates a block diagram of exemplary system that facilitates enhancing interaction with an online data store leveraging cloud or remote techniques.

FIG. 5 illustrates a system 500 that facilitates enhancing interaction with an online data store leveraging cloud or remote techniques. The system 500 can further utilize a cloud 502 that can incorporate at least one of the safe deposit box 104, the map component 102, or the interface 108, and/or any suitable combination thereof. It is to be appreciated that the cloud 502 can include any suitable component, device, hardware, and/or software associated with the subject innovation. The cloud 502 can refer to any collection of resources (e.g., hardware, software, combination thereof, etc.) that are maintained by a party (e.g., off-site, on-site, third party, etc.) and accessible by an identified user (not shown) over a network (e.g., Internet, wireless, LAN, cellular, Wi-Fi, WAN, etc.). The cloud 502 is intended to include any service, network service, cloud service, collection of resources, etc. and can be accessed by an identified user via a network. For instance, two or more users can access, join, and/or interact with the cloud 502 and, in turn, at least one of the safe deposit box 104, the map component 102, or the interface 108, and/or any suitable combination thereof. In other words, a remote user can connect to the safe deposit box 104 via a remote connection in order to enable remote data access. Moreover, the map component 102 can enable seamless integration of the safe deposit box 104 into the operating system (OS) 106. In addition, the cloud 502 can provide any suitable number of service(s) to any suitable number of user(s) and/or client(s). In particular, the cloud 502 can include resources and/or services that integrate the online safe deposit box 104 into the operating system 106.

Figure 6:
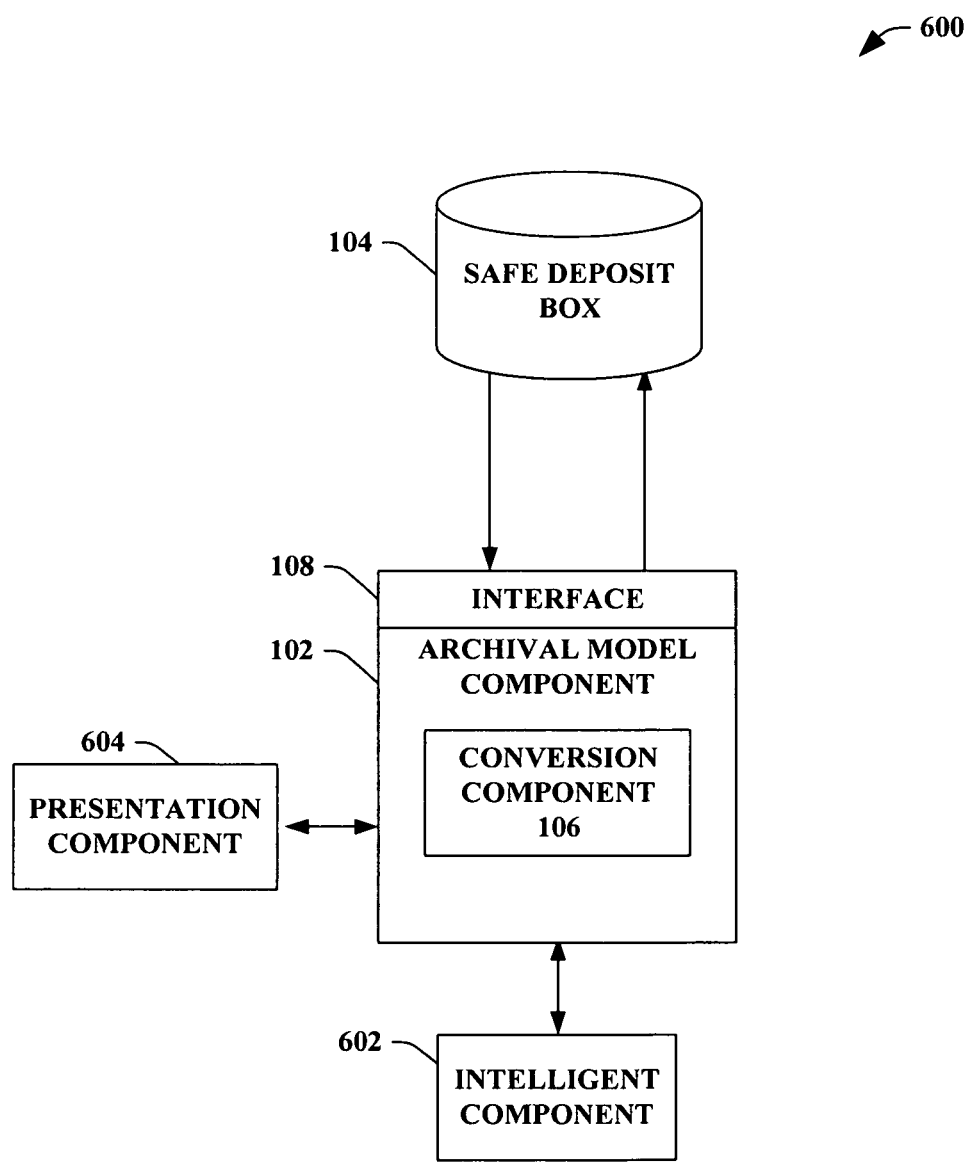
FIG. 6 illustrates a block diagram of an exemplary system that facilitates automatically managing perpetual archived data within a safe deposit box.

FIG. 6 illustrates a system 600 that employs intelligence to facilitate automatically managing perpetual archived data within a safe deposit box. The system 600 can include the archival model component 102, the safe deposit box 104, the conversion component 106, and the interface 108, which can be substantially similar to respective components, boxes, and interfaces described in previous figures. The system 600 further includes an intelligent component 602. The intelligent component 602 can be utilized by the archival model component 102 to facilitate implementing a safe deposit box that can enable perpetual storage for a lifespan of the safe deposit box, restricted access to the safe deposit box, and assurance of data preservation. For example, the intelligent component 602 can infer user-specific preferences related to the safe deposit box 104, user preference for data storage within the safe deposit box 104, access settings specific for a particular user, a policy for a specific user, pre-defined durations for data retention or preservation, etc.

The intelligent component 602 can employ value of information (VOI) computation in order to identify appropriate access settings or policies. For instance, by utilizing VOI computation, the most ideal and/or appropriate access settings and/or policies can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The archival model component 102 can further utilize a presentation component 604 that provides various types of user interfaces to facilitate interaction between a user and any component coupled to the archival model component 102. As depicted, the presentation component 604 is a separate entity that can be utilized with the archival model component 102. However, it is to be appreciated that the presentation component 604 and/or similar view components can be incorporated into the archival model component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the archival model component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
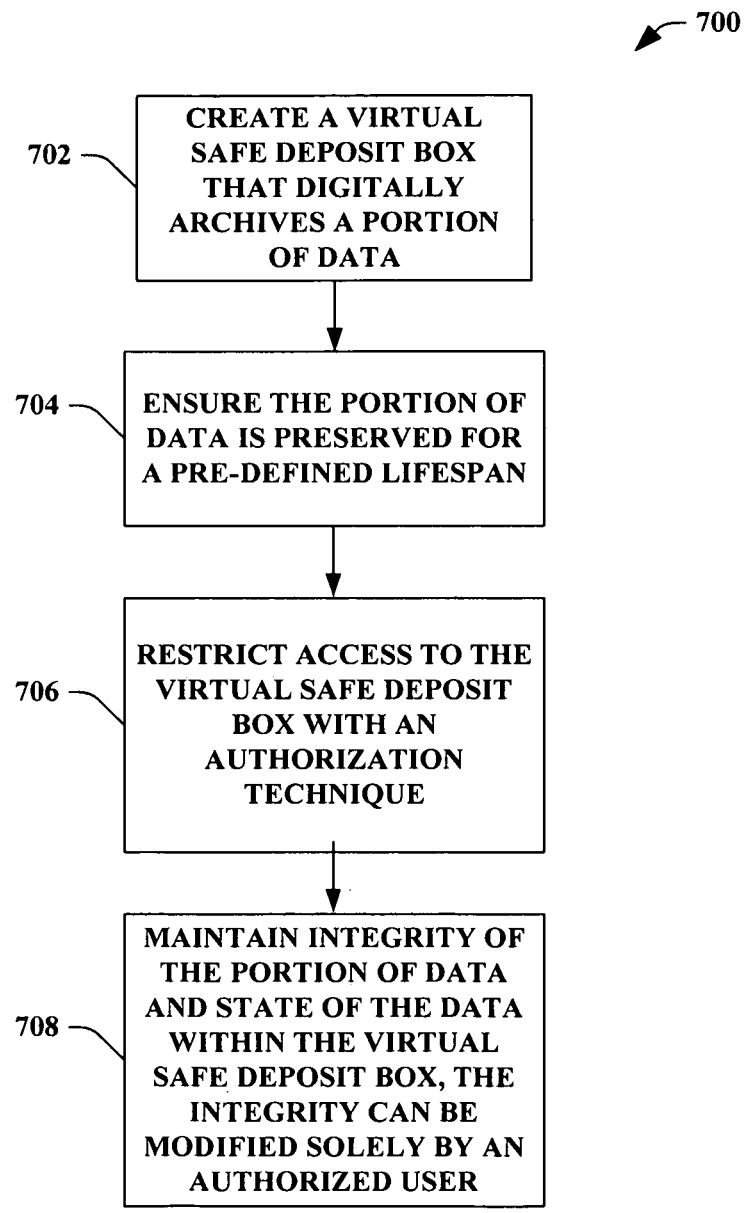
FIG. 7 illustrates an exemplary methodology for archiving digital information perpetually.
Figure 8:
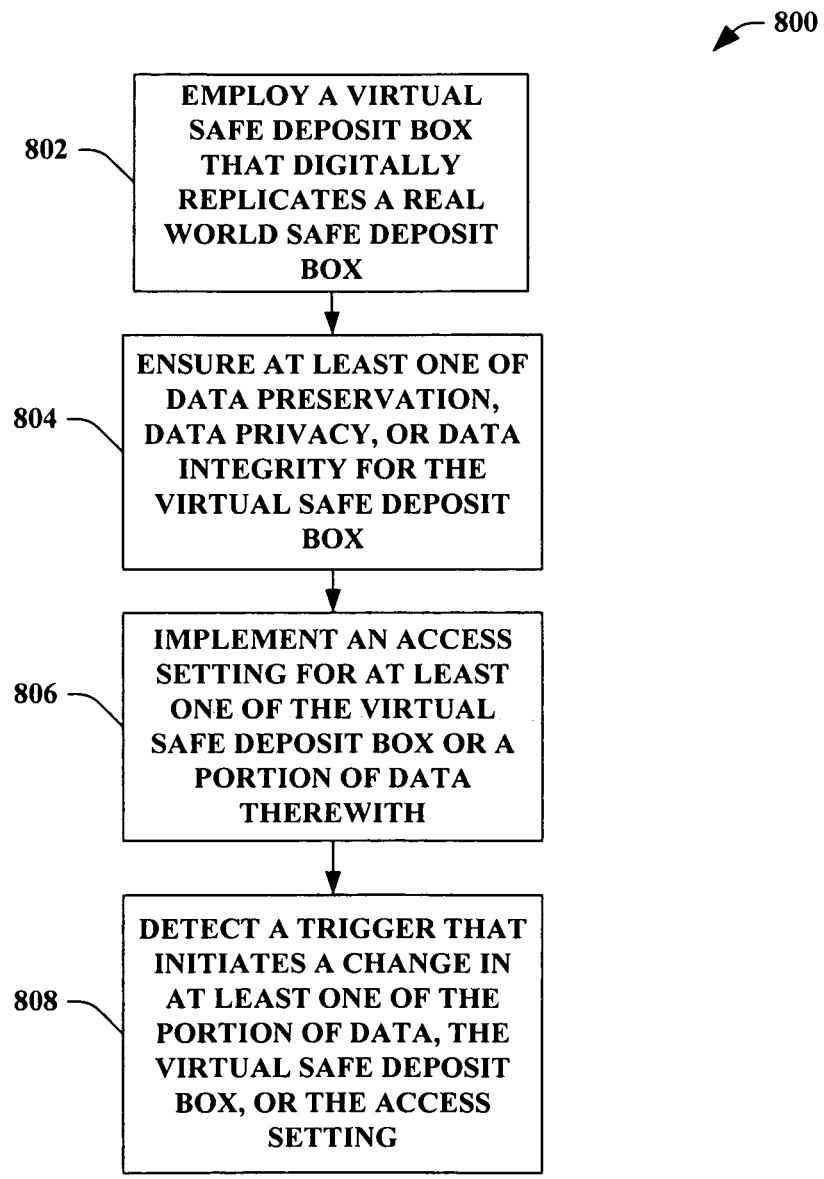
FIG. 8 illustrates an exemplary methodology that facilitates enhancing a safe deposit box to manage digital forms of data.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates archiving digital information perpetually. At reference numeral 702, a virtual safe deposit box that digitally archives a portion of data can be created. The virtual safe deposit box can provide a digital archival of data that provides equivalent or greater guarantees and security that a true safe deposit box would provide. The virtual safe deposit box can be any suitable online data storage that can store data. Furthermore, the safe deposit box can enable a user to upload data to the safe deposit box as well as download data from the safe deposit box. It is to be appreciated that the safe deposit box 104 can be substantially similar to an electronic form of a physical bank deposit box.

At reference numeral 704, the portion of data can be ensured and guaranteed to be preserved for a pre-defined lifespan. For example, the lifespan can be that of the virtual safe deposit box, the lifespan of an owner of the virtual safe deposit box, the lifespan of a defined or identified entity (e.g., an entity identified by the owner of the virtual safe deposit box), etc. In general, the portion of data can be preserved for a pre-defined duration, wherein such duration can be indefinite.

At reference numeral 706, access to the virtual safe deposit box can be restricted with an authorization technique. In other words, access or connectivity with the virtual safe deposit box can be protected or private unless such access or connectivity is granted. The authorization can be an authorized user or entity designated by at least one of the owner of the virtual safe deposit box or a data storage service provider that maintains the virtual safe deposit box. Moreover, the authorization technique can be, but is not limited to, a proof of identify, a secure key, a username, a password, any suitable verification technique, etc.

At reference numeral 708, integrity of the portion of data and/or the state of the data within the virtual safe deposit box can be maintained, wherein the integrity can be modified solely by an authorized user. For example, the authorized user can be an entity that satisfies the authorization technique. Moreover, the integrity of the portion of data or the state of the data within the virtual safe deposit box can be guaranteed to not be changed, modified, corrupted, or accessed unless such actions are performed by an authorized user or entity.

FIG. 8 illustrates a method 800 for enhancing a safe deposit box to manage digital forms of data. At reference numeral 802, a virtual safe deposit box that digitally replicates a real world safe deposit box can be employed. At reference numeral 804, at least one of data preservation, data privacy, or data integrity can be ensured for the virtual safe deposit box. At reference numeral 806, an access setting for at least one of the virtual safe deposit box or a portion of data stored therewith can be implemented. For example, the access setting can include configurations related to who can access data within the virtual safe deposit box, which data a user/entity can access within the safe deposit box, data modification abilities for data within the virtual safe deposit box (e.g., read, write, edit, etc.), type of data access (e.g., upload to the virtual safe deposit box, download from the virtual safe deposit box, etc.), duration of an access setting (e.g., user A can access the virtual safe deposit box for two years, etc.), and the like. At reference numeral 808, a trigger can be detected that can initiate a change in at least one of the portion of data, the virtual safe deposit box, or the access setting. For example, the trigger can be a policy such as a data duration policy, a transfer policy, an access policy, a custom policy, and the like.

Figure 9:
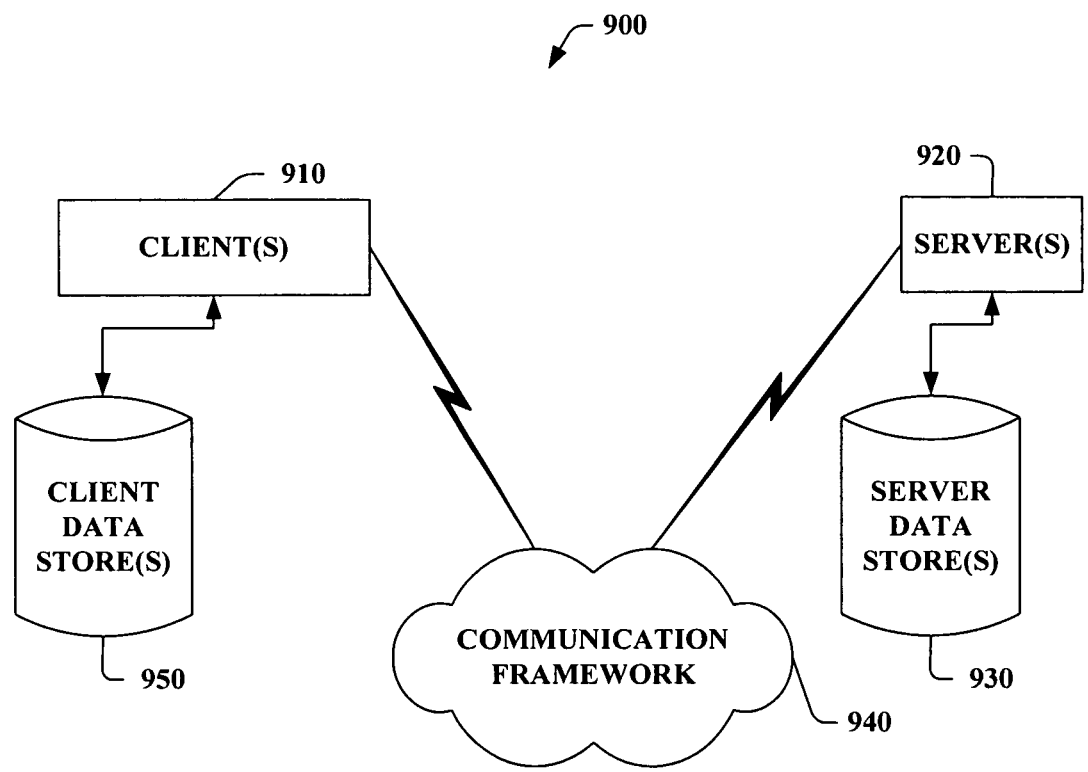
FIG. 9 illustrates an exemplary networking environment, wherein the novel aspects of the claimed subject matter can be employed.
Figure 10:
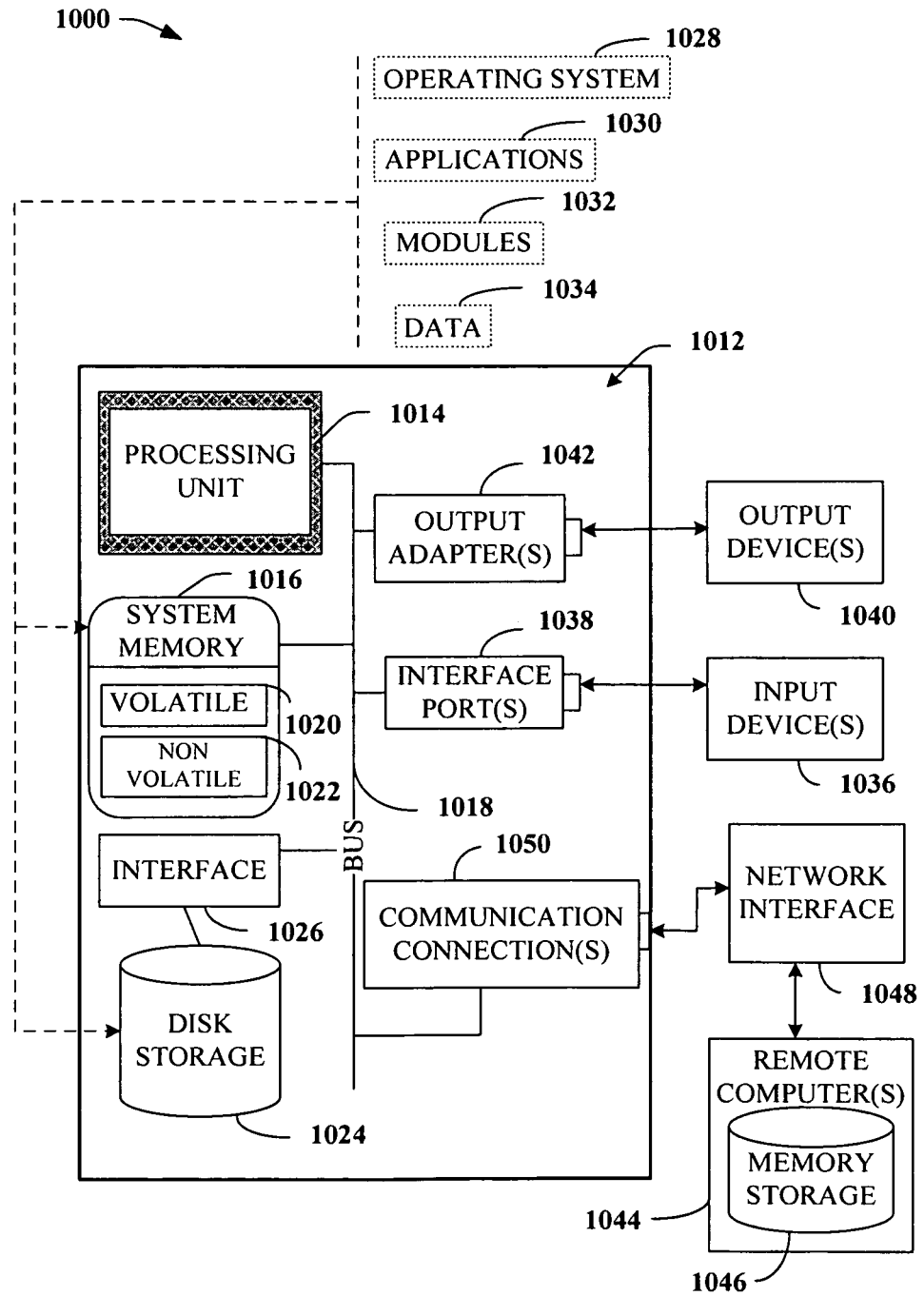
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an archival model component that can leverage techniques in order to provide perpetual archiving for digital data within a safe deposit box, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example. It is to be appreciated that in addition to data servers, other services can be federated and/or stored in disparate geographic locations. Thus, redundant copies of data can be stored in different geographic locations on various servers.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for managing a virtual safe deposit box, comprising:
   one or more processing units; and
   memory comprising instructions that when executed by at least some of the one or more processing units implement the following:
   an archival model component facilitating retention of data stored by the virtual safe deposit box for a pre-defined duration, the archival model component archiving the data to the virtual safe deposit box in real time, the pre-defined duration comprising a lifespan of the virtual safe deposit box, a lifespan of an owner of the virtual safe deposit box, a lifespan of an owner-identified as an authorized entity, or a lifespan of a data storage service provider;
   an intelligent component automatically determining a value of information, where the information is represented by the data, the automatic determination of the value of information based at least in part on reasoning about and inferring states of a system, an environment associated with the virtual safe deposit box and a user of the virtual safe deposit box from a set of observations captured via one or more events and second data, the automatic determination of the value of information performed using a support vector machine, a neural network, an expert system, a Bayesian belief network, fuzzy logic or a data fusion engine, the inferring comprising identifying a context associated with the virtual safe deposit box, identifying an action that the user desires to be automatically performed and generating a probability distribution over states of interest based at least in part on the one or more events and the second data;
   a privacy component controlling access to the virtual safe deposit box based at least in part on the authorized entity;
   an integrity component maintaining at least a portion of the data in a state unless the state is changed by the authorized entity;
   a conversion component transforming at least a portion of the data from a physical form to a digital form; and
   a policy engine:
      enforcing a policy comprising an access setting associated with an ability for one or more authorized entities to access the data, the access setting managing one or more permissions associated with at least a portion of the data, the access based at least in part on a pre-authorized entity;
      modifying the access setting based at least in part on the automatically determined value of information; and
      enforcing a transfer policy for triggering a transfer of:
         at least some of the data to an entity; and
         the virtual safe deposit box to the entity, the enforcing automatically performed based at least in part on a passage of a duration of time, the policy engine implementing a data duration policy for defining a duration and a lifespan of at least a portion of the data, the policy engine implementing a second policy making at least a portion of the data not recoverable.

2. The system of claim 1, the virtual safe deposit box comprising an online safe deposit box.

3. The system of claim 2, the online safe deposit box comprising online data storage.

4. The system of claim 1, the virtual safe deposit box accessible via a computer.

5. The system of claim 1, the virtual safe deposit box accessible via a laptop.

6. The system of claim 1, the virtual safe deposit box accessible via a portable digital assistant.

7. The system of claim 1, the virtual safe deposit box accessible via a smartphone.

8. The system of claim 1, the virtual safe deposit box accessible via a mobile device.

9. The system of claim 1, the virtual safe deposit box accessible via a cellular device.

10. The system of claim 1, the virtual safe deposit box accessible via a portable gaming device.

11. The system of claim 1, the virtual safe deposit box accessible via a media player.

12. The system of claim 1, the virtual safe deposit box accessible via a web browser.

13. The system of claim 1, the virtual safe deposit box accessible via a device that leverages an operating system.

14. The system of claim 1, the entity comprising a disparate entity.

15. The system of claim 1, the policy engine implementing the second policy in response to a triggering event.

16. The system of claim 1, comprising a cloud hosting the virtual safe deposit box.

17. The system of claim 1, comprising a log component tracking activity related to the virtual safe deposit box.

18. A method, comprising:
   facilitating retention of data stored by a virtual safe deposit box for a pre-defined duration and archiving the data to the virtual safe deposit box in real time, the pre-defined duration comprising a lifespan of the virtual safe deposit box, a lifespan of an owner of the virtual safe deposit box, a lifespan of an owner-identified as an authorized entity, or a lifespan of a data storage service provider;
   automatically determining a value of information, where the information is represented by the data, the automatic determination of the value of information based at least in part on reasoning about and inferring states of a system, an environment associated with the virtual safe deposit box and a user of the virtual safe deposit box from a set of observations captured via one or more events and second data, the automatic determination of the value of information performed using a support vector machine, a neural network, an expert system, a Bayesian belief network, fuzzy logic or a data fusion engine, the inferring comprising identifying a context associated with the virtual safe deposit box, identifying an action that the user desires to be automatically performed and generating a probability distribution over states of interest based at least in part on the one or more events and the second data;
   controlling access to the virtual safe deposit box based at least in part on the authorized entity;
   maintaining at least a portion of the data in a state unless the state is changed by the authorized entity;
   transforming at least a portion of the data from a physical form to a digital form;
   enforcing a policy comprising an access setting associated with an ability for one or more authorized entities to access the data, the access setting managing one or more permissions associated with at least a portion of the data, the access based at least in part on a pre-authorized entity;
   modifying the access setting based at least in part on the automatically determined value of information; and
   enforcing a transfer policy for triggering a transfer of:
      at least some of the data to an entity; and
      the virtual safe deposit box to the entity, the enforcing automatically performed based at least in part on a passage of a duration of time, a policy engine implementing a data duration policy for defining a duration and a lifespan of at least a portion of the data, the policy engine implementing a second policy making at least a portion of the data not recoverable,
   at least some of the method implemented at least in part via a processing unit.

19. The method of claim 18, the virtual safe deposit box comprising an online safe deposit box.

20. A computer-readable device comprising instructions, which when executed at least in part via a processing unit on a computer perform acts, comprising:
   facilitating retention of data stored by a virtual safe deposit box for a pre-defined duration, comprising archiving the data to the virtual safe deposit box in real time, the pre-defined duration comprising a lifespan of the virtual safe deposit box, a lifespan of an owner of the virtual safe deposit box, a lifespan of an owner-identified as an authorized entity, or a lifespan of a data storage service provider;
   automatically determining a value of information, where the information is represented by the data, the automatic determination of the value of information based at least in part on reasoning about and inferring states of a system, an environment associated with the virtual safe deposit box and a user of the virtual safe deposit box from a set of observations captured via one or more events and second data, the automatic determination of the value of information performed using a support vector machine, a neural network, an expert system, a Bayesian belief network, fuzzy logic or a data fusion engine, the inferring comprising identifying a context associated with the virtual safe deposit box, identifying an action that the user desires to be automatically performed and generating a probability distribution over states of interest based at least in part on the one or more events and the second data;
   controlling access to the virtual safe deposit box based at least in part on the authorized entity;
   maintaining at least a portion of the data in a state unless the state is changed by the authorized entity;
   transforming at least a portion of the data from a physical form to a digital form;
   enforcing a policy comprising an access setting associated with an ability for one or more authorized entities to access the data, the access setting managing one or more permissions associated with at least a portion of the data, the access based at least in part on a pre-authorized entity;
   modifying the access setting based at least in part on the automatically determined value of information; and
   enforcing a transfer policy for triggering a transfer of:
      at least some of the data to an entity; and
      the virtual safe deposit box to the entity, the enforcing automatically performed based at least in part on a passage of a duration of time, a policy engine implementing a data duration policy for defining a duration and a lifespan of at least a portion of the data, the policy engine implementing a second policy making at least a portion of the data not recoverable.

* * * * *